US011984237B1

(12) United States Patent
Meshchaninov et al.

(10) Patent No.: US 11,984,237 B1
(45) **Date of Patent: *May 14, 2024**

(54) SOURCE OF CHARGED PARTICLES

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,126

(22) Filed: Oct. 5, 2023

Related U.S. Application Data

(63) Continuation of application No. PCT/RU2023/000237, filed on Aug. 3, 2023.

(30) Foreign Application Priority Data

Jul. 20, 2023 (RU) ................................ 2023119246

(51) Int. Cl.
*H02H 3/00* (2006.01)
*G21K 5/02* (2006.01)

(52) U.S. Cl.
CPC ..................................... *G21K 5/02* (2013.01)

(58) Field of Classification Search
None
See application file for complete search history.

(56) References Cited

U.S. PATENT DOCUMENTS 8,519,355 B2 * 8/2013 Buhler .................... H01J 27/26 250/423 P
9,949,425 B2 * 4/2018 Rögner .................. A61L 2/087
(Continued)

FOREIGN PATENT DOCUMENTS

CN 203057022 U 7/2013
CN 103368447 A 10/2013
(Continued)

OTHER PUBLICATIONS

Piskarev I.M., Oxidation-reduction processes in water initiated by electrical discharge above water surface // General Chemistry Journal, 2001, vol. 71, Issue 10, p. 1622.
(Continued)

*Primary Examiner* — Stephen W Jackson
(74) *Attorney, Agent, or Firm* — Bardmesser Law Group

(57) ABSTRACT

The invention relates to obtaining flow of electrically charged particles of a substance (such as dust). The invention is directed to attaining a technical effect of simplifying design and providing possibility of obtaining flow of charged particles with no use of high voltage sources. The technical effect is attained by a source of charged particles implemented as an inner hollow cylinder and an outer hollow cylinder with a gap between them, with a means for providing airflow with substance particles along surfaces of the cylinders that form the gap. The airflow is directed from first butt ends of the cylinders to second butt ends of the cylinders. Materials of the cylinder surfaces forming the gap are selected so that the substance particles and the surfaces
(Continued)

obtain opposite electrical charges upon friction of the substance particles against the surfaces.

19 Claims, 1 Drawing Sheet

(56) References Cited

U.S. PATENT DOCUMENTS

| | | | | |
|---|---|---|---|---|
| 10,806,018 | B2 * | 10/2020 | Weidauer | G21K 5/02 |
| 11,824,468 | B1 * | 11/2023 | Meshchaninov | F23G 5/085 |
| 2022/0088651 | A1 | 3/2022 | Nakaishi | |

FOREIGN PATENT DOCUMENTS

| | | | |
|---|---|---|---|
| CN | 110995050 | A | 4/2020 |
| EA | 12275 | B1 | 8/2009 |
| ES | 2909949 | A1 | 5/2022 |
| RU | 2 049 050 | C1 | 11/1995 |
| RU | 2 105 040 | C1 | 2/1998 |
| RU | 2 294 354 | C2 | 2/2007 |
| RU | 2326487 | C2 | 6/2008 |
| RU | 2 515 307 | C1 | 5/2014 |
| RU | 2 528 848 | C1 | 9/2014 |
| RU | 2 572 998 | C2 | 12/2014 |
| RU | 2 619 122 | C1 | 5/2017 |
| RU | 2 741 004 | C1 | 1/2021 |
| RU | 2 764 684 | C1 | 1/2022 |
| RU | 211 306 | U1 | 5/2022 |
| RU | 2 775 021 | C1 | 6/2022 |
| RU | 211 473 | U1 | 6/2022 |
| RU | 2 786 209 | C1 | 12/2022 |
| RU | 2021 130 871 | A | 4/2023 |
| RU | 2021 130 949 | A | 4/2023 |
| RU | 2 802 933 | C1 | 5/2023 |
| RU | 2 797 526 | C1 | 6/2023 |
| SU | 1744101 | A1 | 6/1992 |

OTHER PUBLICATIONS

Sinkevich A.A., Dovgalyuk Yu. A., Corona discharge in clouds, News of Higher Schools, Radiophysics, 2013, vol. 56, Issue 11-12, pp. 908-919.

* cited by examiner

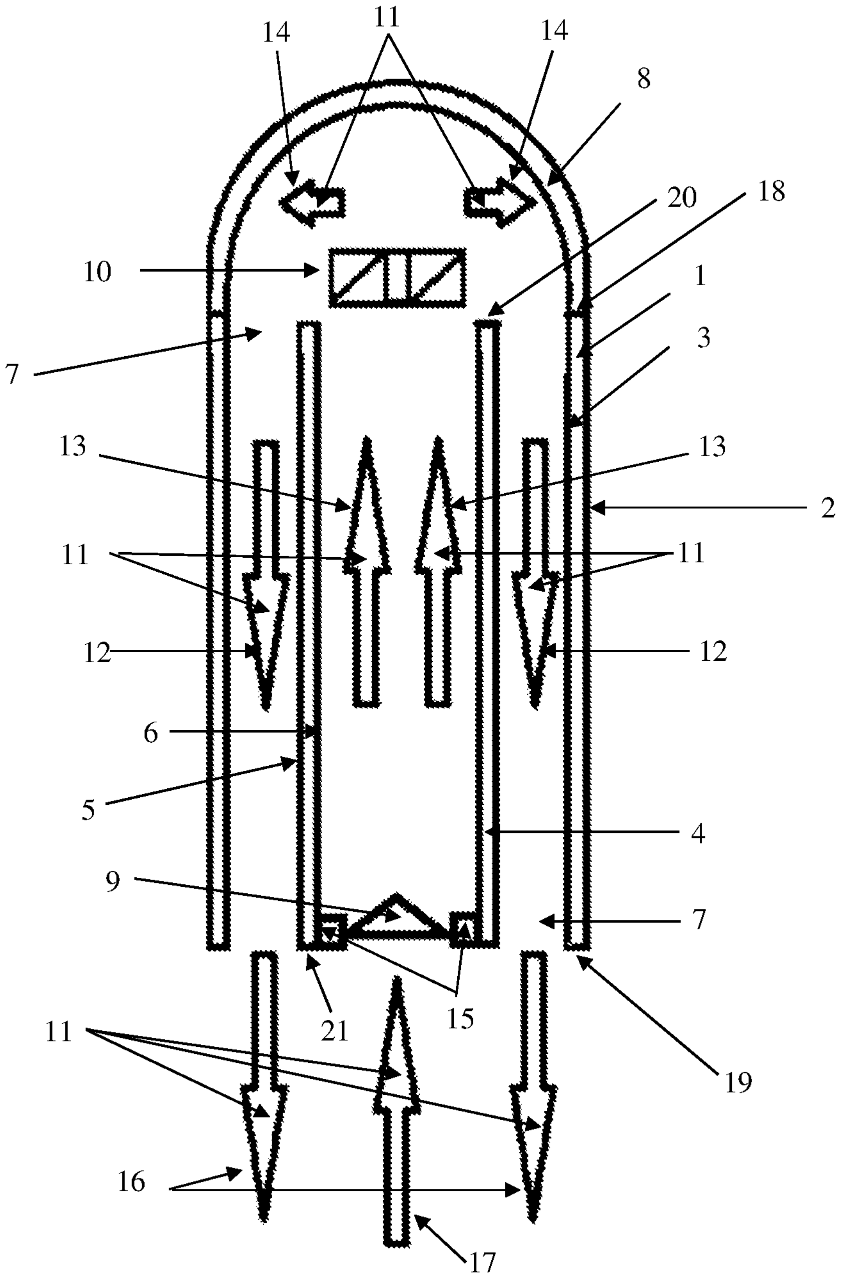
14
11
14
8
20
18
10
1
7
3
13
13
2
11
11
12
12
6
5
4
9
7
21
15
11
19
16
17

SOURCE OF CHARGED PARTICLES

BACKGROUND OF THE INVENTION

Field of Invention

The invention relates to obtaining flow of electrically charged particles of a substance.

CONVENTIONAL ART

There is a known injector of charged micro particles of invention according to patent RU2551129 (published on May 20, 2015). High voltage is provided to a silo electrode and AC voltage of a resonance frequency is provided to a piezoelectric emitter, which assures motion of micro dust particles in silo chamber and injection thereof into a charge chamber cavity. The charge chamber contains a set of horizontal or vertical carbon strings. When micro particles contact needle tips of the strings, they are charged and leave the charge chamber via vertical or horizontal openings due to action of electric field, thus forming flow of charged micro particles.

Drawbacks of this technical solution are structural complexity and necessity of providing high voltage for the electrodes.

SUMMARY OF THE INVENTION

The invention is directed to attaining a technical effect of simplifying design and providing possibility of obtaining flow of charged particles with no use of high voltage sources.

The technical effect is attained by a source of charged particles implemented as an inner hollow cylinder and an outer hollow cylinder with a gap between them, with a means for providing airflow with substance particles along surfaces of the cylinders that form the gap. The airflow is directed from first butt ends of the cylinders to second butt ends of the cylinders. Materials of the cylinder surfaces forming the gap are selected so as the substance particles and the surfaces obtain opposite electrical charges upon friction of the substance particles against the surfaces.

In one embodiment, the surfaces of the inner and outer hollow cylinders forming the gap are made of different materials.

In one embodiment, the inner and outer hollow cylinders are located coaxially.

In one embodiment, the means for providing airflow with substance particles is implemented in form of a first deflector secured to the first butt end of the outer cylinder and an axial fan located near the first deflector. The first deflector diverts the airflow with substance particles towards the gap. The axial fan draws air with substance particles from the inner cylinder. Diameter of blades of the fan is smaller than inner diameter of the inner cylinder.

In one embodiment, the source of charged particles is further equipped with a device for introducing air with substance particles into an inner cavity of the inner cylinder.

Preferably, the device for introducing air with substance particles into the inner cavity of the inner cylinder is secured to the second butt end of the inner cylinder.

Preferably, the device for introducing air with substance particles into the inner cavity of the inner cylinder is implemented in form of a second deflector that deflects the charged particles. The second deflector is made of metal and it has openings for non-charged particles.

Preferably, the inner and outer cylinders are made circular and straight. Preferably, the cylinders are made of metal. Preferably, the used substance particles are dielectric particles.

In one embodiment, the outer cylinder has two layers and its outer metal shell is grounded.

In one embodiment, the inner cylinder has two layers and its inner metal surface is grounded.

Preferably, the hollow cylinder is positioned vertically. Preferably, the first deflector is made of solid metal and grounded. Preferably, the first deflector is implemented as a semi-sphere. Preferably, the second deflector is made of metal and implemented as a grid secured to the second butt end of the inner cylinder via isolation members.

Preferably, the grid of the second deflector is implemented as radially directed metal strips. Preferably, planes of the metal strips are inclined relative to surface of the grid of the second deflector. Preferably, the grid of the second deflector is implemented as a cone.

Additional features and advantages of the claimed solution are described in the following disclosure, as well as proved by the actual practice of the invention. These advantages and improvements can be achieved by neural networks that have been constructed and trained in accordance with the claimed method, specifically, following the disclosure, along with the accompanying claims and drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a schematic representation of a source of charged particles, wherein the following designators are used:

DETAILED DESCRIPTION OF EMBODIMENTS OF THE INVENTION

Reference will now be made in detail to the preferred embodiments of the present invention, examples of which are illustrated in the accompanying drawings.

FIG. 1 is a schematic representation of a source of charged particles, wherein the following designators are used:

1 outer cylinder
2 outer surface of outer cylinder
3 inner surface of outer cylinder
4 inner cylinder
5 outer surface of inner cylinder
6 inner surface of inner cylinder
7 gap between cylinders (1) and (4)
8 first deflector in form of a semi-sphere
9 second deflector in form of a conical grid
10 suction axial fan
11 substance particles
12 airflow in gap (7) with substance particles (11) between cylinders (1) and (4) 13 airflow with non-charged substance particles (11) from second deflector (9) to first deflector (8)
14 airflow with substance particles (11) along surface of first deflector (8)
15 isolation members
16 airflow with charged substance particles (11)
17 airflow with non-charged substance particles (11)

18 first butt end of outer cylinder (1)
19 second butt end of outer cylinder (1)
20 first butt end of inner cylinder (4)
21 second butt end of inner cylinder (4).

The source of charged particles may be implemented as an apparatus including an inner hollow cylinder (4) and an outer hollow cylinder (1) located vertically and coaxially with the gap (7) between them. The device includes a first deflector (8) attached to a first butt end (18) of outer cylinder (1). The first deflector (8) diverts airflow (14) with substance particles (11) towards a gap (7). The device includes an axial fan (10) located near the first deflector (8). The axial fan (10) draws airflow (13) with the substance particles (11) from the inner cylinder (4). Diameter of blades of the axial fan (10) is smaller than an inner diameter of the inner cylinder (4). The apparatus includes a device for introducing the airflow (17) with non-charged substance particles (11) into inner cavity of the inner cylinder (4), which is implemented as a second deflector (9) in form of a metal grid secured to a second butt end (21) of the inner cylinder (4) via isolation members (15).

Material of the substance particles (11) and material of surfaces (3) and (5) of the cylinders (1) and (4), correspondingly, are selected, based on fact of that, during friction of two chemically identical bodies, the most consistent one is charged positively. Metals are charged either positively or negatively during friction against a dielectric material. During friction of two dielectric materials, the most dielectrically permissive dielectric material is charged positively. Substances may be organized into triboelectric series, where the previous body is charged positively and the subsequent body is charged negatively (the Faraday series: (+) furs, flannel, elephant ivory, feathers, quartz crystal, flint glass, cotton fabric, silk, timber, metals, sulphur (−)).

Dielectric materials placed in triboelectric series show descent in hardness (the Gezekhus series: (+) diamond (hardness of 10), topaz (hardness of 8), quartz crystal (hardness of 7), glossy glass (hardness of 5), mica (hardness of 3), calcite (hardness of 3), sulphur (hardness of 2), wax (hardness of 1) (—)). Metals are characterized by a rise in hardness.

The more surface of bodies in friction, the more electrostatic charge thereof is observed. Dust sliding over a body surface is charged negatively, when the dust is formed of the same body (marble, glass, snow dust). Powders screened through a sieve are also charged.

Triboelectric effect in solid bodies is caused by transfer of charge carriers from one body to another. Triboelectric effect in metals and semiconductors is caused by movement of electrons from a substance with lower work function (F) value to a substance with higher work function (F) value. During contact between a metal and a dielectric material, triboelectric effect is caused by movement of electrons from the metal to the dielectric material. During friction of two dielectric materials, triboelectric effect is caused by diffusion of electrons and ions.

During friction of the airflow (12) with the substance particles (11) in the gap (7) against the inner surface (3) of the outer cylinder (1) and/or the outer surface (5) of the inner cylinder (4), the surfaces (3) and (5) of the cylinders (1) and (4) are charged (e.g., positively). Further, air with (negatively) charged substance particles (11) forms the flow (16) that may be directed to a consumer. Some of the charged substance particles (11) may be drawn by the suction axial fan (10) to the first deflector (8) with the airflow (17) containing non-charged substance particles (11). The charged substance particles (11) transfer their (negative) charge to the second deflector (9) upon contact therewith. Further, neutral substance particles (11) are directed towards the first deflector (8) via openings in the second deflector (9). Other charged substance particles (11) of the flow (16) will be pushed away from the second deflector (9) by electrostatic forces. The charged substance particles (11) of the flow (16) still passed inside the inner cylinder via openings of the second deflector (9) are directed towards the first deflector (8) with the flow (13), where they lose their charge and form the airflow (14) with non-charged substance particles (11) together with non-charged substance particles (11) of the flow (13). The airflow (14) turns to the airflow (12) with non-charged substance particles (11), which are charged (negatively) again in the gap (7) due to friction against surfaces (3) and (5) of the cylinders (1) and (4) and become ready for using by a consumer. The surfaces (3) and (5) of the cylinders (1) and (4) are charged up to voltage values so as draining current of the material of the surfaces (3) and (5) of the cylinders (1) and (4) compensates charging current generated due to friction of the flow (13) of the substance particles (11) against the surfaces (2) and (5).

Thus, the technical effect of providing a simple design of an electrostatic frictional source of charged particles is attained.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A source of charged particles, comprising:

an inner hollow cylinder and an outer hollow cylinder with a gap between them, and means for providing airflow with substance particles along surfaces of the cylinders forming the gap, the airflow directed from first butt ends of the cylinders to second butt ends of the cylinders, wherein materials of surfaces of the hollow cylinders forming the gap are selected so as the substance particles and the surfaces obtain opposite electrical charges upon friction of the substance particles against the surfaces.

2. The source of charged particles of claim 1, wherein a surfaces of the inner hollow cylinder is made of a different material than a surface of the outer hollow cylinder.

3. The source of charged particles of claim 1, wherein the inner and outer hollow cylinders are coaxial.

4. The source of charged particles of claim 1, wherein the means for providing airflow with substance particles includes a first deflector secured to the first butt end of the outer cylinder and an axial fan located in proximity to the first deflector, wherein the first deflector is configured to divert the airflow towards the gap, wherein the axial fan is configured to draw air with the substance particles from the inner hollow cylinder, and wherein a diameter of blades of the fan is smaller than an inner diameter of the inner hollow cylinder.

5. The source of charged particles of claim 4, wherein the first deflector is made of solid metal and is grounded.

6. The source of charged particles of claim 4, wherein the first deflector has a semi-spherical shape.

7. The source of charged particles of claim 1, further comprising a device for introducing air with non-charged substance particles into an inner cavity of the inner hollow cylinder.

8. The source of charged particles of claim 7, wherein the device is secured to the second butt end of the inner hollow cylinder.

9. The source of charged particles of claim 8, wherein the device is a second deflector made of metal with openings for non-charged particles and configured to deflect the charged particles.

10. The source of charged particles of claim 9, wherein the second deflector is made of metal and implemented as a grid secured to the second butt end of the inner cylinder via isolation members.

11. The source of charged particles of claim 10, wherein the grid is implemented as radially directed metal strips.

12. The source of charged particles of claim 11, wherein planes of the metal strips are inclined relative to surface of the grid.

13. The source of charged particles of claim 12, wherein the grid has conical shape.

14. The source of charged particles of claim 1, wherein the inner and outer hollow cylinders are circular and straight.

15. The source of charged particles of any of claim 1, wherein the hollow cylinders are made of metal.

16. The source of charged particles of claim 1, wherein the substance particles are made of a dielectric material.

17. The source of charged particles of claim 1, wherein the outer hollow cylinder has two layers and its outer metal shell is grounded.

18. The source of charged particles of claim 1, wherein the inner hollow cylinder has two layers and its inner metal surface is grounded.

19. The source of charged particles of claim 1, wherein the hollow cylinders are oriented vertically.

* * * * *